United States Patent
Agapiou et al.

(10) Patent No.: US 10,053,612 B2
(45) Date of Patent: Aug. 21, 2018

(54) LIQUID ANTI-SHRINKAGE AGENT FOR CEMENT

(71) Applicant: Halliburton Energy Services, Inc., Houston, TX (US)

(72) Inventors: Kyriacos Agapiou, Houston, TX (US); Cody Glenn Harris, Tomball, TX (US); Samuel J. Lewis, Spring, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/329,201

(22) PCT Filed: Nov. 7, 2014

(86) PCT No.: PCT/US2014/064563
§ 371 (c)(1),
(2) Date: Jan. 25, 2017

(87) PCT Pub. No.: WO2016/073000
PCT Pub. Date: May 12, 2016

(65) Prior Publication Data
US 2017/0240793 A1     Aug. 24, 2017

(51) Int. Cl.
*C09K 8/467*   (2006.01)
*C04B 22/08*   (2006.01)
(Continued)

(52) U.S. Cl.
CPC ............... *C09K 8/467* (2013.01); *C04B 22/08* (2013.01); *C04B 28/04* (2013.01); *C04B 28/065* (2013.01);
(Continued)

(58) Field of Classification Search
CPC .......... C09K 8/43; C09K 8/437; C04B 22/08; C04B 28/04; E21B 33/14
See application file for complete search history.

(56) References Cited

U.S. PATENT DOCUMENTS 4,357,166 A    11/1982  Babcock
4,482,379 A *  11/1984  Dibrell .................... C04B 28/14
                                                          106/609

(Continued)

FOREIGN PATENT DOCUMENTS

GB        1402887          8/1975
WO     2014-029658         2/2014
WO     WO 2016053319 A1 *  4/2016  ............. C04B 28/04

OTHER PUBLICATIONS

International Search Report and Written Opinion, Application No. PCT/US2014/064563; 8 pgs, dated Jul. 20, 2015.

(Continued)

*Primary Examiner* — Zakiya W Bates
*Assistant Examiner* — Crystal J Miller
(74) *Attorney, Agent, or Firm* — Baker Botts L.L.P.

(57) ABSTRACT

The present disclosure relates to a liquid agent that mitigates shrinkage of cement, particularly cement used in a hydrocarbon-producing well. The anti-shrinkage agent includes a slow-setting calcium aluminate cement as well as gypsum and may exhibit shelf-life stability, physical stability, or both. The present disclosure further relates to methods of cementing a hydrocarbon-producing well using the anti-shrinkage agent and to cements containing the anti-shrinkage agent.

20 Claims, 2 Drawing Sheets

(51) Int. Cl.
*E21B 33/14* (2006.01)
*C04B 28/06* (2006.01)
*C04B 28/14* (2006.01)
*C04B 28/04* (2006.01)
C04B 103/56 (2006.01)
C04B 103/22 (2006.01)
C04B 103/32 (2006.01)

(52) U.S. Cl.
CPC .............. *C04B 28/14* (2013.01); *E21B 33/14* (2013.01); *C04B 2103/22* (2013.01); *C04B 2103/32* (2013.01); *C04B 2103/58* (2013.01)

(56) References Cited

U.S. PATENT DOCUMENTS

| | | | | |
|---|---|---|---|---|
| 4,488,909 | A * | 12/1984 | Galer | C04B 28/04 106/695 |
| 6,251,180 | B1 * | 6/2001 | Engstrand | C04B 24/023 106/724 |
| 6,384,141 | B2 | 5/2002 | Hirata et al. | |
| 6,607,592 | B1 | 8/2003 | Ceccaldi | |
| 6,869,474 | B2 * | 3/2005 | Perez-Pena | C04B 28/04 106/727 |
| 8,070,878 | B2 * | 12/2011 | Dubey | C04B 20/1051 106/713 |
| 8,298,332 | B2 * | 10/2012 | Dubey | C04B 20/1051 106/713 |
| 2002/0004559 | A1 | 1/2002 | Hirata et al. | |
| 2007/0284104 | A1 | 12/2007 | Beckman | |
| 2009/0011207 | A1 * | 1/2009 | Dubey | C04B 20/1051 428/219 |
| 2010/0175589 | A1 | 7/2010 | Charpentier et al. | |
| 2012/0040165 | A1 * | 2/2012 | Dubey | C04B 20/1051 428/220 |
| 2014/0034314 | A1 * | 2/2014 | Lewis | C04B 28/18 166/292 |
| 2014/0083698 | A1 | 3/2014 | Stone et al. | |
| 2015/0033989 | A1 * | 2/2015 | Perez-Pena | C04B 22/16 106/691 |
| 2015/0203407 | A1 * | 7/2015 | Girot | C04B 28/065 427/140 |
| 2017/0088465 | A1 * | 3/2017 | Touzo | C04B 28/06 |

OTHER PUBLICATIONS

Andreani, P.A.; "Calcium Aluminate Mineral Suspensions, an Innovative Liquid Binder for Construction and Coating Industries;". Technical Paper TP-GB-CH-LAF-039; Kerneos Aluminate Technologies; 13 pages, 2013.

Cementing Field Bulletin No. 66; "MicroBond Expansion Cement Additive;" Chemical Research and Development Department; 8 pages, 1986.

* cited by examiner

LIQUID ANTI-SHRINKAGE AGENT FOR CEMENT

RELATED APPLICATIONS

This application is a U.S. National Stage Application of International Application No. PCT/US2014/064563 filed Nov. 7, 2014, which designates the United States, and is incorporated herein by reference in its entirety.

TECHNICAL FIELD

The present disclosure relates to a liquid agent that mitigates shrinkage of cement, particularly cement used in a hydrocarbon-producing well.

BACKGROUND

Cement is often used to line the well bore of a petrochemical well. For example, a well may be cemented along a length of the well bore in preparation for production. Cement shrinkage can have a number of adverse effects on the integrity of the well, therefore, it is often desirable to avoid it.

BRIEF DESCRIPTION OF THE DRAWINGS

These drawings illustrate certain aspects of some of the embodiments of the present disclosure, and should not be used to limit or define the claims.

Figure 1:
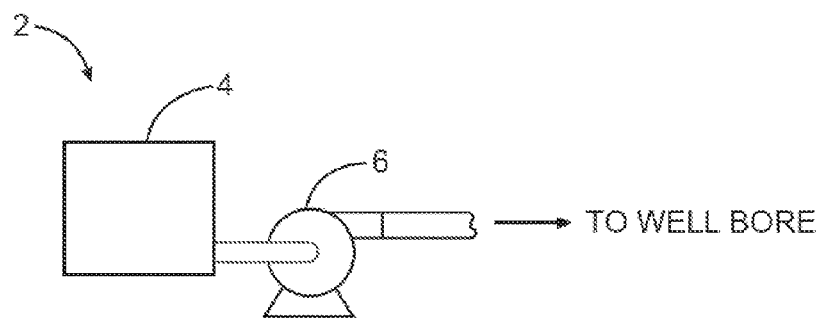
FIG. 1 illustrates a system for preparation and delivery of a cement composition to a well bore in accordance with aspects of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure provides compositions and methods of anti-shrinkage agents for cement, such as primary cement for a well bore. More particularly, in certain embodiments, the present disclosure relates to liquid anti-shrinkage agents for use with aluminate cements. Anti-shrinkage agents are also sometimes referred to as expansion aids.

There may be several potential advantages to the methods and compositions of the present disclosure, only some of which are alluded to herein. One advantage relates to the ability of the anti-shrinkage agent to be provided in a stable liquid form. This form facilitates use in operations taking place where liquid material are preferred, such as off-shore operations.

The anti-shrinkage agent may be in liquid form before and during addition to a primary aluminate cement. In particular, it may be in the form of a slurry. At some point after addition to the primary cement, such when the primary cement finally sets or hardens, the agent may assume a solid form.

The anti-shrinkage agent may include slow-setting calcium aluminate cement (also referred to as retarded calcium aluminate cement due to the delay or retardation of setting), gypsum ($CaSO_4.2H_2O$), and water. The relative proportions of cement:gypsum by weight may range from 4:1 to 1:4, particularly 1:1 to 1.6:1. Water may be added to obtain and maintain a desired rheology. In the absence of an activator, this anti-shrinkage agent may remain in liquid form for at least six months, or even at least nine months, which reflects shelf-life stability. In some instances, the anti-shrinkage agent may also be resistant to setting, which reflects physical stability. The liquid anti-shrinkage agent may exhibit good shelf-life stability and physical stability. For both types of stability, it may be at least as stable as the calcium aluminate cement it contains.

The slow-setting calcium aluminate cement may contain between 30% and 80% alumina ($Al_2O_3$), as measured by X-Ray Flourescence (XRF) chemistry or an equivalent method. In particular, it may contain between 40% and 80% alumina, specifically between 60% and 70% alumina. In some instances, it may contain at least 30% alumina, at least 40% alumina, or at least 60% alumina.

The slow-setting calcium aluminate cement may be any grade or brand that contains one or more blocking agents to prevent or slow setting of the cement. For example, the slow-setting calcium aluminate cement may contain one or more boron-containing materials, such as boric acid, borate or a boric acid or borate-containing material, such as a boric acid salt (e.g. zinc borate, sodium borate and mixtures thereof) that prevent or slow setting of the cement. The boron-containing material may be present in an amount of 1 to 3 wt % based on the total weight of calcium aluminate cement. In addition, one or more blocking agents may prevent or slow reaction of the cement with gypsum, for example by acting as a nucleation point.

The slow-setting calcium aluminate cement may also be any grade or brand that contains a rheology-modifying additive to help maintain the initial or optimal rheology of the cement. For example, the slow-setting calcium aluminate cement may contain a plasticizer or superplasticizer. The plasticizer or superplasticizer may be present in an amount of 1 to 5 wt % based on the total weight of calcium aluminate cement.

In one embodiment, the slow-setting calcium aluminate cement may be described in United States Published Patent Application 2010/0175589 or in Kerneos Aluminate Technologies Technical Paper No.: TP-GB-CH-LAF-039, which describe slow-setting calcium aluminate cements, particularly the amounts of blocking agents and additives thereto and overall chemical composition. An example slow-setting calcium aluminate cement is described in Example 1 below.

The slow-setting calcium aluminate cement may remain dormant until its pH is raised to an alkaline pH by the addition of suitable alkaline activators. For instance, the slow-setting calcium aluminate cement may be activated by the alkalinity of primary cement, such as Portland cement, after the anti-shrinkage agent is added to the primary cement.

The anti-shrinkage agent may additionally include one or more of a lithium compound, an alkaline component, such as a salt of a strong base and/or salt of a weak base, a dispersing agent, an additional rheology-modifying additive, or a supplementary, or filler material. These additional components may be added when the anti-shrinkage agent is formed, shortly prior to use, or at any time in between. These agents, particularly lithium compounds, may be present in an amount of between 0.1 to 5.0 wt % based on the total weight of the calcium aluminate cement. The appropriate amount may vary by additive.

Example salts of strong base and/or salt of a weak base include lime. The addition of a salt of a strong base and/or a salt of a weak base, such as lime may help with distribution of the anti-shrinkage agent when it is added to cement. However, because many cements set when the pH is raised above neutral, lime or an alternative base is not incorporated with a liquid anti-shrinkage agent. Rather, it may be added to the cement as a separate co-additive with the liquid anti-shrinkage agent.

Without limiting the invention to a single mode of action, at least one way in which the anti-shrinkage agent mitigates shrinkage of cement is by promoting the formation of ettringite ($Ca6Al_2(SO_4)_3(OH)_{12}.26H_2O$). Ettringite has a large crystal volume compared to other cement components and thus imparts expansive properties to the cement.

The present disclosure further includes a cement composition including a primary cement and any anti-shrinkage agent described herein. The primary cement may include any hydraulic cement. A hydraulic cement may be any cement that includes calcium, aluminum, silicon, oxygen, or sulfur and which sets and hardens by reaction with water. For example, it may include Portland cements (e.g., classes A, C, G, and H Portland cements), pozzolana cements, gypsum cements, phosphate cements, high alumina content cements, silica cements, high alkalinity cements, and combinations thereof. The proportion of anti-shrinkage agent in the cement composition may be between 1% by weight of cement (bwoc) and 20% bwoc, more particularly between 5% bwoc and 15% bwoc.

The cement composition may be formed by mixing the anti-shrinkage agent with the primary cement no more than twenty four hours before use, no more than twelve hours before use, no more than one hour before use, or no more than thirty minutes before use. The appropriate time for mixing may be determined by one of ordinary skill in the art, with the benefit of the present disclosure based on the compositions of the anti-shrinkage agent and the primary cement.

The cement composition may be used in a hydrocarbon-producing well, for example in cementing a well bore. In particular, it may be used to secure, protect, and/or support a casing in a well bore.

The anti-shrinkage compositions disclosed herein may directly or indirectly affect one or more components or pieces of equipment associated with the preparation, delivery, recapture, recycling, reuse, and/or disposal of the disclosed cement or anti-shrinkage compositions. For example, the disclosed anti-shrinkage and cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary anti-shrinkage compositions or cement compositions. The disclosed anti-shrinkage compositions may also directly or indirectly affect any transport or delivery equipment used to convey the anti-shrinkage or cement compositions to a well site or downhole such as, for example, any transport vessels, conduits, pipelines, trucks, tubulars, and/or pipes used to compositionally move the anti-shrinkage or cement compositions from one location to another, any pumps, compressors, or motors (e.g., topside or downhole) used to drive the anti-shrinkage or cement compositions into motion, any valves or related joints used to regulate the pressure or flow rate of the anti-shrinkage or cement compositions, and any sensors (i.e., pressure and temperature), gauges, and/or combinations thereof, and the like. The disclosed anti-shrinkage and cement compositions may also directly or indirectly affect the various downhole equipment and tools that may come into contact with the anti-shrinkage or cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition containing the anti-shrinkage composition and a primary cement in accordance with example embodiments will now be described. FIG. 1 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore. In one embodiment, the anti-shrinkage composition may be added to the primary cement in mixing equipment 4.

Figure 2A:
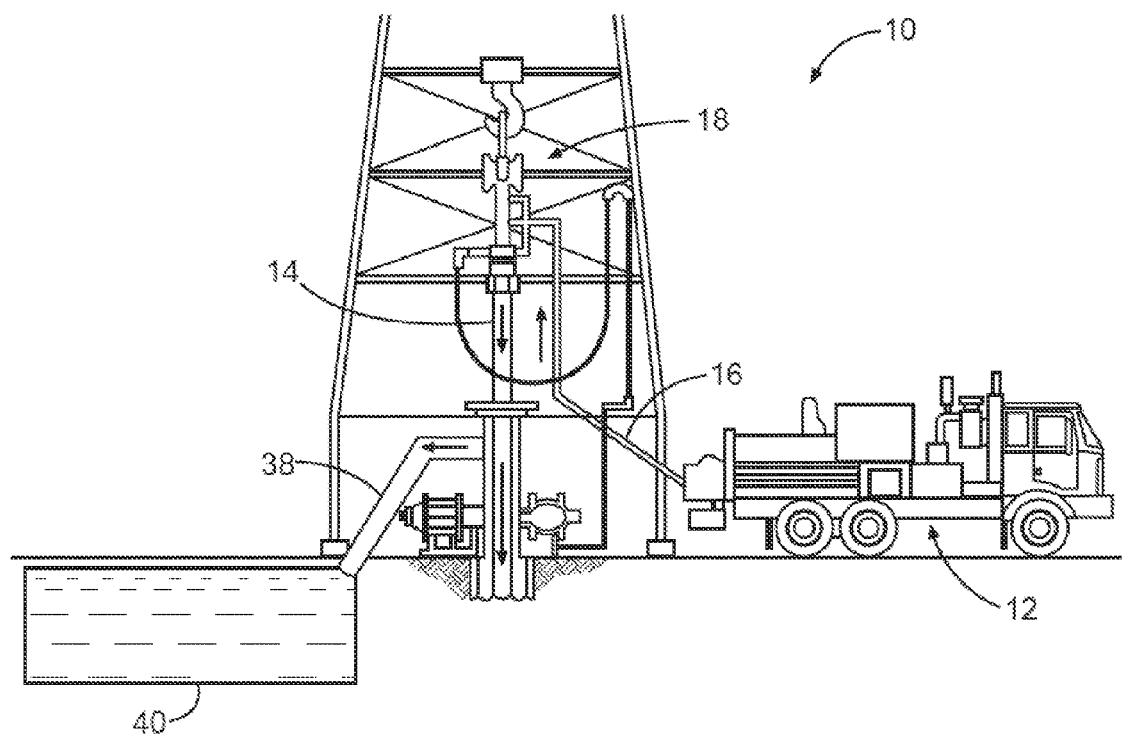
FIG. 2A illustrates surface equipment that may be used in placement of a cement composition in a well bore in accordance with aspects of the present disclosure.

An example technique and system for placing a cement composition, such as a cement composition containing any anti-shrinkage composition described herein, into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
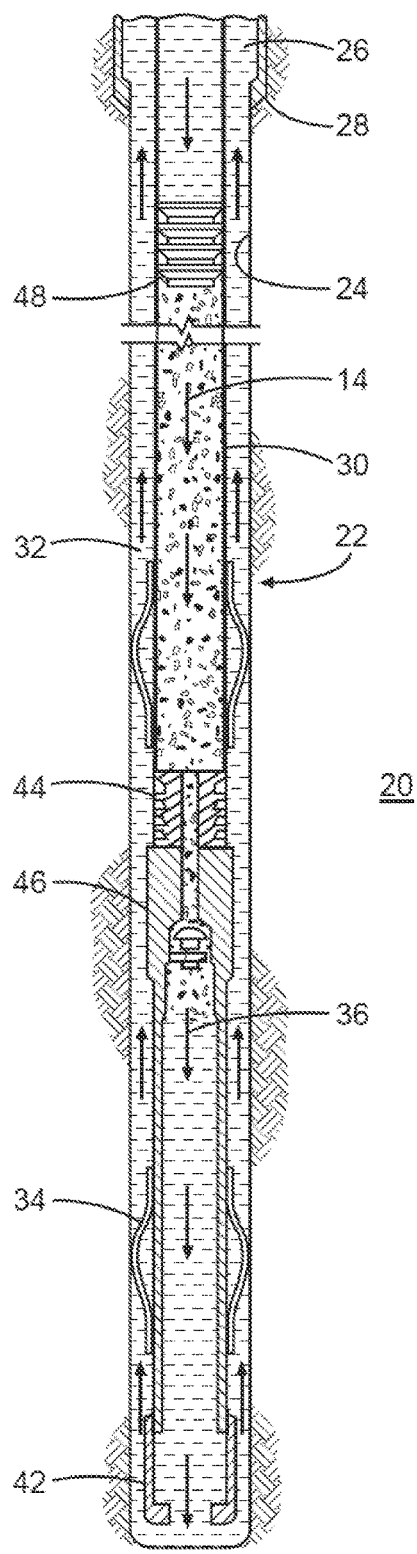
FIG. 2B illustrates placement of a cement composition into a well bore annulus in accordance with aspects of the present disclosure.

Turning now to FIG. 2B, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the well bore 22 behind the binder composition 14. The top plug 48 may separate the cement composition 14 from a displacement fluid and also push the cement composition 14 through the bottom plug 44.

Embodiments disclosed herein include:

A. A method of cementing a hydrocarbon-producing well by adding an anti-shrinkage agent to a primary cement to form a cement, and introducing the cement into a well bore of the hydrocarbon-producing well. The anti-shrinkage agent includes slow-setting calcium aluminate cement and gypsum in a ratio of between 4:1 and 1:2 and further comprises water.

B. An anti-shrinkage agent including slow-setting calcium aluminate cement, gypsum, and water. The slow-setting calcium aluminate cement and gypsum are present in a ratio of between 4:1 and 1:2. The anti-shrinkage agent remains in a liquid slurry for at least six months after it is formed.

Both of embodiments A and B may have one or more of the following additional elements in any combination: The cement includes between 1% by weight of cement (bwoc) and 20% bwoc anti-shrinkage agent. The primary cement includes a hydraulic cement. The slow-setting calcium aluminate cement includes between 30 mol % and 80 mol % aluminate ($Al_2O_3$). The slow-setting calcium aluminate cement includes a blocking agent. The blocking agent includes borate or boric acid. The slow-setting calcium aluminate cement includes a rheology modifying additive. The rheology modifying additive includes a plasticizer or a superplasticizer. The anti-shrinkage agent and the primary cement are mixed using mixing equipment. The cement is introduced into the well bore using one or more pumps. The yield point of the anti-shrinkage agent as measured by a Fann Yield Stress Adapter (FYSA) viscometer at rotations per minute (rpm) of between 3 and 600 changes by no more than 20% over three weeks. The anti-shrinkage agent sets upon introduction of an alkaline agent. The alkaline agent includes an alkaline primary cement. The alkaline primary cement includes Portland cement.

EXAMPLES

To facilitate a better understanding of the present disclosure, the following examples of certain aspects of some embodiments are given. In no way should the following examples be read to limit or define the scope of the claims.

Example 1

The following experiment was conducted to test the anti-shrinkage properties of one example agent according to the present disclosure. The anti-shrinkage agent was formed using a slow-setting calcium aluminate cement mixture (Kerneos, Inc., France), which contains approximately 60 wt % calcium aluminate and less than 10 wt % other additives in water. In particular the slow-setting calcium aluminate cement may be 60 wt % Secar 71® calcium aluminate cement (Kerneos, Inc., France) in water. Gypsum and water were added to the slow-setting calcium aluminate cement to form the anti-shrinkage agent. The wt ratio of gypsum to slow-setting calcium aluminate cement was 1:1 (300 g each). Upon preparation, the anti-shrinkage agent was approximately 66 wt % active solids. Water was added as needed to maintain a manageable and stable rheology for the anti-shrinkage agent. The composition of the anti-shrinkage agent as prepared is further described in Table 1.

TABLE 1

| Composition of Anti-Shrinkage Agent | | |
|---|---|---|
| Material | Amount (g) | wt % |
| Slow-setting calcium aluminate cement mixture | 500 g (including 300 g calcium aluminate cement) | 54.76 |
| Gypsum | 300 g | 32.86 |
| Water | 113 g | 12.38 |

Example 2

The rheological stability of the anti-shrinkage agent of Example 1 was evaluated using Fann Yield Stress Adapter (FYSA) viscometer measurements taken when the agent was prepared and after three weeks of storage under ambient conditions. (SPE 133050, Techniques for the Study of Foamed Cement Rheology, Olowolagba and Brenneis, 2010 describes the FYSA viscometer and related techniques.) FYSA measurements directly measure the yield point (RD) of the agent and are provided in Table 2. These measurements establish that there was little change in the rheology of the anti-shrinkage agent over three weeks of storage, demonstrating shelf-life stability.

TABLE 2

FYSA Measurements of Anti-Shrinkage Agent

| RPM | 3 | 6 | 100 | 200 | 300 | 600 |
|---|---|---|---|---|---|---|
| Time = 0 | 10 | 12.5 | 32.5 | 43.5 | 52.5 | 81 |
| Time = 3 weeks | 8 | 11 | 33.5 | 45 | 55 | 88 |

Example 3

To evaluate the anti-shrinkage properties of the anti-shrinkage agent of Example 1, a standard Portland cement primary cement slurry was prepared and cured in an annular expansion mold at 100° F. in an atmospheric water bath, either with or without the anti-shrinkage agent. The compositions of Sample I, which contained the anti-shrinkage agent, and Sample II, which did not contain the anti-shrinkage agent, are provided in Table 3. Readings for both samples were taken using a micrometer initially upon their preparation, after one day, after three days, and after seven days. Results from these readings are provided in Table 4. The results show that after one day of curing, Sample I, which contains the anti-shrinkage agent, exhibited 1.3 times greater expansion than Sample II, which lacked the agent. Comparison of both samples at days three and seven shows that expansion in Sample I continued and exceeded 2 times the expansion of Sample II. Overall, Sample II showed little change in expansion after one day. Thus, the anti-shrinkage agent was effective at causing expansion and thus limiting shrinkage of Portland cement.

TABLE 3

Composition of Sample I and Sample II

| Component | Sample I | Sample II |
|---|---|---|
| Class H Portland Cement | 700 g | 700 g |
| Anti-shrinkage agent (10% bwoc) | 106.5 g | 0 g |
| Halad ® 322 (0.6% bwoc) | 4.2 g | 4.2 g |
| CaCl$_2$ (1.0% bwoc) | 7 g | 7 g |
| 5.58 gps DI Water (49.5% bwoc) | 309.5 g | 309.5 g |

Halad® is a registered trademark of Halliburton (Houston, Tex.). Halad® is a fluid-loss additive designed for low-temperature wells. Similar amounts of other fluid-loss additives may be used for different cementing operations.

TABLE 4

Percent Expansion of Sample I and Sample II Upon Curing Over Time

| Sample | Day 1 | Day 3 | Day 7 |
|---|---|---|---|
| I (Anti-shrinkage agent) | 3.59% | 5.90% | 6.09% |
| II (Cement only) | 2.81% | 2.99% | 3.18% |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

The invention claimed is:

1. A method of cementing a hydrocarbon-producing well comprising:
    adding an anti-shrinkage agent to a primary cement to form a cement, wherein the anti-shrinkage agent comprises slow-setting calcium aluminate cement and gypsum in a ratio of between 4:1 and 1:2, further comprises water, and remains in a liquid slurry for at least six months after it is formed; and
    introducing the cement into a well bore of the hydrocarbon-producing well.

2. The method of claim 1, wherein the cement comprises between 1% by weight of cement (bwoc) and 20% bwoc anti-shrinkage agent.

3. The method of claim 1, wherein the primary cement comprises a hydraulic cement.

4. The method of claim 1, wherein the slow-setting calcium aluminate cement comprises between 30 mol % and 80 mol % aluminate (Al$_2$O$_3$).

5. The method of claim 1, wherein the slow-setting calcium aluminate cement comprises a blocking agent.

6. The method of claim 5, wherein the blocking agent comprises borate.

7. The method of claim 1, wherein the slow-setting calcium aluminate cement comprises a rheology modifying additive.

8. The method of claim 7, wherein the rheology modifying additive comprises a plasticizer or a superplasticizer.

9. The method of claim 1, further comprising mixing the anti-shrinkage agent and the primary cement using mixing equipment.

10. The method of claim 1, further comprising introducing the cement into the well bore using one or more pumps.

11. An anti-shrinkage agent comprising:
    slow-setting calcium aluminate cement;
    gypsum;
    and water,
    wherein the slow-setting calcium aluminate cement and gypsum are present in a ratio of between 4:1 and 1:2, and
    wherein the anti-shrinkage agent remains in a liquid slurry for at least six months after it is formed.

12. The anti-shrinkage agent of claim 11, wherein the slow-setting calcium aluminate cement comprises between 30 mol % and 80 mol % aluminate (Al$_2$O$_3$).

13. The anti-shrinkage agent of claim 11, wherein the slow-setting calcium aluminate cement comprises a blocking agent.

14. The anti-shrinkage agent of claim 13, wherein the blocking agent comprises borate.

15. The anti-shrinkage agent method of claim 11, wherein the slow-setting calcium aluminate cement comprises rheology modifying additive.

16. The anti-shrinkage agent of claim 15, wherein the rheology modifying additive comprises a plasticizer or a superplasticizer.

17. The anti-shrinkage agent of claim 11, wherein the yield point of the agent as measured by a Fann Yield Stress Adapter (FYSA) viscometer at rotations per minute (rpm) of between 3 and 600 changes by no more than 20% over three weeks.

18. The anti-shrinkage agent of claim 11, wherein the anti-shrinkage agent sets upon introduction of an alkaline agent.

19. The anti-shrinkage agent of claim 18, wherein the alkaline agent comprises an alkaline primary cement.

20. The anti-shrinkage agent of claim 19, wherein the alkaline primary cement comprises Portland cement.

\* \* \* \* \*